US012067926B2

(12) United States Patent
Xiao

(10) Patent No.: US 12,067,926 B2

(45) Date of Patent: Aug. 20, 2024

(54) DRIVING SYSTEM AND DRIVING METHOD OF DISPLAY PANEL

(71) Applicant: TCL CHINA STAR OPTOELECTRONICS TECHNOLOGY CO., LTD., Shenzhen (CN)

(72) Inventor: Bo Xiao, Shenzhen (CN)

( * ) Notice: Subject to any disclaimer, the term of this patent is extended or adjusted under 35 U.S.C. 154(b) by 0 days.

(21) Appl. No.: 17/299,331

(22) PCT Filed: Apr. 30, 2021

(86) PCT No.: PCT/CN2021/091562

§ 371 (c)(1),
(2) Date: Jun. 3, 2021

(87) PCT Pub. No.: WO2022/227021

PCT Pub. Date: Nov. 3, 2022

(65) Prior Publication Data

US 2024/0013701 A1 Jan. 11, 2024

(30) Foreign Application Priority Data

Apr. 25, 2021 (CN) ......................... 202110446155.8

(51) Int. Cl.
*G09G 3/20* (2006.01)
*G09G 3/36* (2006.01)

(52) U.S. Cl.
CPC ............. *G09G 3/2096* (2013.01); *G09G 3/36* (2013.01); *G09G 2320/0233* (2013.01); *G09G 2320/0626* (2013.01); *G09G 2320/0673* (2013.01); *G09G 2360/16* (2013.01); *G09G 2370/00* (2013.01)

(58) Field of Classification Search
None
See application file for complete search history.

(56) References Cited

U.S. PATENT DOCUMENTS

| | | | | |
|---|---|---|---|---|
| 9,779,804 | B2 * | 10/2017 | Oh | G11C 11/5628 |
| 2017/0169746 | A1 * | 6/2017 | Wu | G09G 3/3611 |
| 2020/0013326 | A1 * | 1/2020 | Zheng | G09G 3/20 |
| 2022/0292003 | A1 * | 9/2022 | Yu | G06F 11/162 |
| 2022/0343845 | A1 * | 10/2022 | Wu | G09G 3/035 |
| 2022/0351679 | A1 * | 11/2022 | Yang | G09G 3/2092 |

FOREIGN PATENT DOCUMENTS

| | | | |
|---|---|---|---|
| CN | 104064141 | A | 9/2014 |
| CN | 107170415 | A | 9/2017 |
| CN | 107863058 | A | 3/2018 |
| CN | 109389959 | A | 2/2019 |
| CN | 110379385 | A | 10/2019 |

* cited by examiner

*Primary Examiner* — Matthew Yeung

(57) ABSTRACT

A driving system and a driving method of a display panel are provided. A flash memory is disposed in a first circuit board of the driving system, and a timing controller is disposed in a second circuit board of the driving system. In this way, only one flash memory is needed to store basic configuration data of the timing controller and adjustment data of the display panel, and a number of flash memory is decreased in comparison with two flash memories required in conventional technology. Flash memory capacity is reasonably used, preventing a waste of flash memory capacity while saving production cost.

18 Claims, 2 Drawing Sheets

DRIVING SYSTEM AND DRIVING METHOD OF DISPLAY PANEL

FIELD OF INVENTION

The present application relates to the field of display technology, and especially to a timing controller, a control method thereof, and a display device with the timing controller.

BACKGROUND OF INVENTION

Currently, liquid crystal displays are controlled and driven by separately manufactured and sold several circuit boards, and each circuit board perform different functions. For example, FIG. 1 is a driving structure schematic diagram of conventional liquid crystal displays. As shown in FIG. 1, a timing controller is disposed on a control circuit board, and a flash memory chip (flash1) is equipped on the control board and configured to store a start-up configuration software of the timing controller. Another flash memory chip (flash2) is equipped on a source circuit board and configured to store adjustment data for improving picture quality such as gamma correction and demura of the liquid crystal displays.

The timing controller is separately connected to flash1 of the control circuit board and flash2 of the source circuit board, and separately reads the start-up configuration software of the timing controller in flash1, and the adjustment data for improving picture quality in flash2, thereby driving the liquid crystal display to display normally according to the start-up configuration software of the timing controller and the adjustment data for improving picture quality. Wherein, because a flash memory chip is equipped on each of the control circuit board and the source circuit board, waste of flash memory capacity would occur, leading to increased production cost of a display panel.

Therefore, a new driving system and driving method of a display panel need to be urgently proposed to solve the technical problem.

SUMMARY OF INVENTION

In a conventional display panel, because a flash memory chip is equipped on each of a control circuit board and a source circuit board, a waste of flash memory capacity would occur, leading to increased production cost of the display panel.

Embodiments of the present application provide a driving system and a driving method of a display panel.

In a first aspect, embodiments of the present application provide a driving system of a display panel that includes a first circuit board and a second circuit board sequentially connected to the display panel, wherein a flash memory is disposed in the first circuit board, a timing controller is disposed in the second circuit board, and the timing controller is connected to the flash memory; wherein the flash memory is configured to store basic configuration data of the timing controller and adjustment data of the display panel; and the timing controller is configured to drive the display panel to display pictures according to the basic configuration data of the timing controller in the flash memory, and adjust display images of the display panel according to the adjustment data of the display panel in the flash memory.

In some embodiments, adjustment parameters of the display panel are obtained by the timing controller through adjusting the display images of the display panel.

In some embodiments, the timing controller is connected to the flash memory through a serial interface.

In some embodiments, the flash memory includes a first storage address and a second storage address, the first storage address is configured to store the basic configuration data of the timing controller, and the second storage address is configured to store the adjustment data of the display panel.

In some embodiments, a reading priority of the first storage address is higher than a reading priority of the second storage address.

In some embodiments, the adjustment data of the display panel includes gamma adjustment parameters and demura compensation parameters, and the driving system includes a gamma adjustment machine and a demura adjustment machine separately connected to the timing controller, wherein the gamma adjustment machine is configured to perform gamma correction to the display panel according to the gamma adjustment parameters of the display panel in the flash memory read by the timing controller; and the demura adjustment machine is configured to perform demura compensation to the display panel according to the demura compensation parameters of the display panel in the flash memory read by the timing controller.

In some embodiments, the gamma adjustment machine and the demura adjustment machine are separately connected to the timing controller through a serial interface.

In a second aspect, embodiments of the present application further provide a driving method of a display panel applied to the above-described driving system of the display panel, and the driving method includes after detecting a power-on signal, obtaining the basic configuration data of the timing controller in the flash memory, and driving the display panel to display pictures according to the basic configuration data of the timing controller; and obtaining the adjustment data of the display panel in the flash memory, and adjusting the display images of the display panel according to the adjustment data of the display panel.

In some embodiments, the obtaining the adjustment data of the display panel in the flash memory specifically includes updating the adjustment data of the display panel through adjusting the display images of the display panel to obtain up-to-date adjustment data of the display panel and store in the flash memory.

In some embodiments, the adjustment data of the display panel includes gamma adjustment parameters and demura compensation parameters; the adjusting the display images of the display panel according to the adjustment data of the display panel specifically includes performing gamma correction to the display panel according to the gamma adjustment parameters of the display panel in the flash memory read by the timing controller; and performing demura compensation to the display panel according to the demura compensation parameters of the display panel in the flash memory read by the timing controller.

In some embodiments, the flash memory includes a first storage address and a second storage address, the first storage address is configured to store the basic configuration data of the timing controller, and the second storage address is configured to store the adjustment data of the display panel.

In some embodiments, a reading priority of the first storage address is higher than a reading priority of the second storage address.

In some embodiments, the obtaining the basic configuration data of the timing controller in the flash memory specifically includes reading the basic configuration data of the timing controller through reading the first storage address.

In some embodiments, the obtaining the adjustment data of the display panel in the flash memory specifically includes reading the adjustment data of the display panel through reading the second storage address.

In a third aspect, embodiments of the present application further provide another driving system of a display panel that includes a first circuit board and a second circuit board sequentially connected to the display panel, wherein a flash memory is disposed in the first circuit board, a timing controller is disposed in the second circuit board, and the timing controller is connected to the flash memory; wherein the flash memory is configured to store basic configuration data of the timing controller and adjustment data of the display panel; the timing controller is configured to drive the display panel to display pictures according to the basic configuration data of the timing controller in the flash memory, and adjust display images of the display panel according to the adjustment data of the display panel in the flash memory; and adjustment parameters of the display panel are obtained by the timing controller through adjusting the display images of the display panel.

In some embodiments, the timing controller is connected to the flash memory through a serial interface.

In some embodiments, the flash memory includes a first storage address and a second storage address, the first storage address is configured to store the basic configuration data of the timing controller, and the second storage address is configured to store the adjustment data of the display panel.

In some embodiments, a reading priority of the first storage address is higher than a reading priority of the second storage address.

In some embodiments, the adjustment data of the display panel includes gamma adjustment parameters and demura compensation parameters, and the driving system includes a gamma adjustment machine and a demura adjustment machine separately connected to the timing controller, wherein the gamma adjustment machine is configured to perform gamma correction to the display panel according to the gamma adjustment parameters of the display panel in the flash memory read by the timing controller; and the demura adjustment machine is configured to perform demura compensation to the display panel according to the demura compensation parameters of the display panel in the flash memory read by the timing controller.

In some embodiments, the gamma adjustment machine and the demura adjustment machine are separately connected to the timing controller through a serial interface.

Embodiments of the present application provide a driving system and a driving method of a display panel. The driving system includes a first circuit board and a second circuit board sequentially connected to the display panel, a flash memory is disposed in the first circuit board, a timing controller is disposed in the second circuit board, and the timing controller is connected to the flash memory, wherein the flash memory is configured to store basic configuration data of the timing controller and adjustment data of the display panel, and the timing controller is configured to drive and adjust the display panel to display pictures according to the basic configuration data of the timing controller and the adjustment data of the display panel in the flash memory. The driving method includes after detecting the display panel powered on, first obtaining the basic configuration data of the timing controller in the flash memory, and driving the display panel to display pictures according to the basic configuration data of the timing controller, and then performing demura compensation to the display panel according to demura compensation parameters of the display panel in the flash memory read by the timing controller. In this way, only one flash memory is needed to store basic configuration data of the timing controller and adjustment data of the display panel, and a number of flash memory is decreased in comparison with two flash memories required in conventional technology. Flash memory capacity is reasonably used, preventing a waste of flash memory capacity while saving production cost.

DETAILED DESCRIPTION OF EMBODIMENTS

For clearer description of purposes, technical approaches, and effects of the present application, the following further describes the present application in detail with reference to accompanying drawings and embodiments. It should be understood that the specific embodiments described here are merely for understanding the present application and are not to limit the present application.

Figure 1:
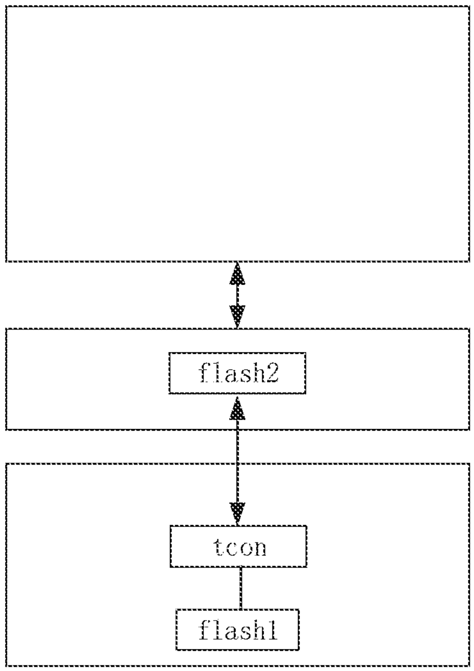
FIG. 1 is a schematic diagram of a driving structure of a conventional liquid crystal display.
Figure 2:
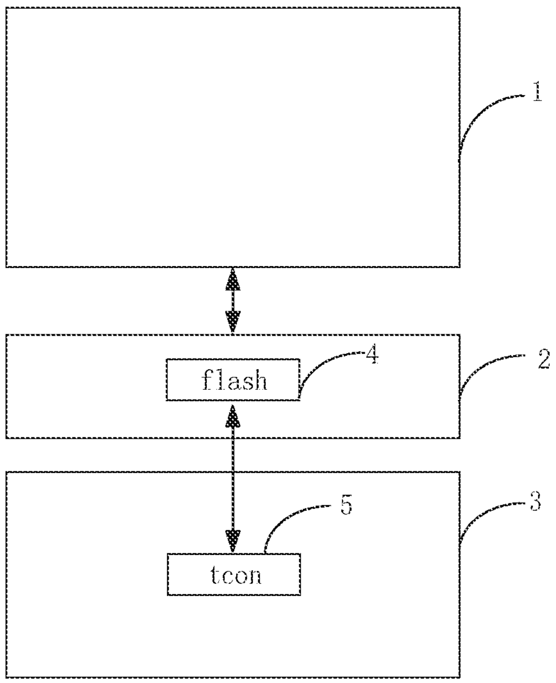
FIG. 2 is a structural schematic diagram of a driving system of a display panel according to embodiments of the present application.

FIG. 2 is a structural schematic diagram of a driving system of a display panel according to embodiments of the present application. As shown in FIG. 2, embodiments of the present application provide a driving system of a display panel, and the driving system of the display panel includes a first circuit board 2 and a second circuit board 3 sequentially connected to the display panel 1, wherein a flash memory 4 (flash) is disposed in the first circuit board 2, a timing controller 5 (tcon) is disposed in the second circuit board 3, and the timing controller 5 is connected to the flash memory 4. Wherein, the flash memory 4 is configured to store basic configuration data of the timing controller 5 and adjustment data of the display panel 1, and the timing controller 5 is configured to drive the display panel 1 to display pictures according to the basic configuration data of the timing controller 5 in the flash memory 4, and adjust display images of the display panel according to the adjustment data of the display panel 1 in the flash memory 4.

Specifically, disposing the timing controller 5 in the second circuit board 3, disposing the flash memory 4 in the first circuit board 2, and storing the basic configuration data of the timing controller 5 and the adjustment data of the display panel in the flash memory 4, wherein the timing controller 5 is connected to the flash memory 4 and reads the basic configuration data of the timing controller 5 and the adjustment data of the display panel stored in the flash memory 4, thereby driving the display panel to display pictures according to the basic configuration data of the timing controller 5 and adjusting display images of the display panel according to the adjustment data of the display panel in the flash memory 4.

The driving system of the display panel according to embodiments of the present application needs only one flash memory 4 to store basic configuration data of the timing controller 5 and adjustment data of the display panel, and a number of flash memory 4 is decreased in comparison with two flash memories 4 required in conventional technology. Capacity of flash memory 4 is reasonably used, preventing a waste of capacity of flash memory 4 while saving production cost.

Wherein, the first circuit board 2 can be a source printed circuit board assembly (PCBA) or an X-board (XB), and the second circuit board 3 can be a control board (CB).

It should be explained that because the flash memory 4 chip can have different storing capacity specifications, a corresponding flash memory 4 can be chosen according to storing capacity required by data that needs to be stored. It should be explained that, in general, capacity required by the basic configuration data of the timing controller 5 is less than capacity required by the adjustment data of the display panel, and therefore the flash memory 4 configured to store the adjustment data of the display panel is directly used to simultaneously store the basic configuration data of the timing controller 5 in embodiments of the present application, i.e., storing both the basic configuration data of the timing controller 5 and the adjustment data of the display panel in one flash memory 4. Furthermore, the timing controller 5 is disposed in the second circuit board 3, and the flash memory 4 is disposed in the first circuit board 2. In this way, different adjustment data set according to different display panels can be stored in the flash memory 4 of the first circuit board 2, and through directly replacing the first circuit board 2, different adjustment data can be chosen, increasing flexibility of the driving system.

It should also be explained that adjustment parameters of the display panel are obtained by the timing controller 5 through adjusting the display images of the display panel, i.e., adjustment parameters originally stored in the flash memory 4 is preliminarily set according to relative parameters of the display panel before driving the display panel, and after the timing controller 5 has adjusted the display images of the display panel, the adjustment parameters can be updated in real time according to real-time display images of the display panel and stored in the flash memory 4, so the adjustment parameters subsequently used to adjust the display panel have been updated. That is, the adjustment parameters of the display panel stored in the flash memory 4 are not fixed, and they are up-to-date adjustment data constantly corrected and improved during a course of adjusting the display images of the display panel, which is highly real-time.

In some embodiments, the flash memory 4 includes a first storage address and a second storage address, the first storage address is configured to store the basic configuration data of the timing controller 5, and the second storage address is configured to store the adjustment data of the display panel. Wherein, a reading priority of the first storage address can be higher than a reading priority of the second storage address. That is, the timing controller 5 reads the basic configuration data and the adjustment data of the display panel from the flash memory 4 in different time slots, i.e., reading the basic configuration data stored in the first storage address first, and then reading the adjustment data of the display panel stored in the second storage address. It should be explained that each time the adjustment data of the display panel in the second storage address is updated, the timing controller 5 is refreshed, and when the display panel is reactivated, the basic configuration data in the first storage address and the adjustment data of the display panel in the second storage address are sequentially read, thereby driving the display panel 1 to display pictures again according to the basic configuration data of the timing controller in the flash memory 4, and adjusting the display images of the display panel 1 according to the adjustment data of the display panel in the flash memory 4.

In some embodiments, the timing controller 5 is connected to the flash memory 4 through a serial interface, and a gamma adjustment machine 6 and a demura adjustment machine 7 are separately connected to the timing controller 5 through a serial interface. The serial interface includes a serial peripheral interface (SPI), an inter-integrated circuit (IIC) interface, etc.

In some embodiments, the adjustment data of the display panel includes gamma adjustment parameters and demura compensation parameters. Wherein, human eyes are nonlinear with respect to brightness and voltage of displays, and in order to ensure matching of display images to human eyes, the gamma adjustment parameters mean gamma voltage correction introduced during adjustment of the display panel. Through gamma correction to adjust a gray level curve of the display panel, optimized visual effects can be achieved. The demura compensation parameters are demura erasing compensation data produced according to demura algorithms to eliminate non-uniform display images.

Figure 3:
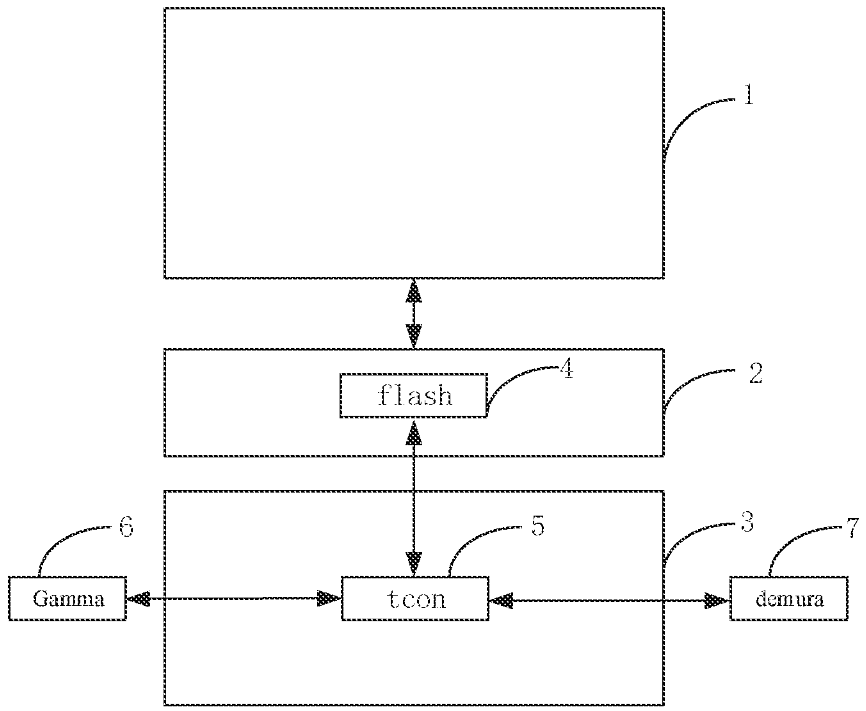
FIG. 3 is another structural schematic diagram of the driving system of the display panel according to embodiments of the present application.

Based on the above-described embodiments, FIG. 3 is another structural schematic diagram of the driving system of the display panel according to embodiments of the present application. As shown in FIG. 3, the driving system of the display panel further includes the gamma adjustment machine 6 and the demura adjustment machine 7 separately connected to the timing controller 5. Wherein, the gamma adjustment machine 6 is configured to perform gamma correction to the display panel according to the gamma adjustment parameters of the display panel in the flash memory 4 read by the timing controller 5. The demura adjustment machine 7 is configured to perform demura compensation on the display panel according to the demura compensation parameters of the display panel in the flash memory 4 read by the timing controller 5.

It should be explained that during the course of the timing controller 5 adjusting the display images of the display panel, adjustment parameters of the display panel such as the gamma adjustment parameters and the demura compensation parameters are updated in real time. That is, the timing controller 5 updates the adjustment parameters in real time during a course of performing the gamma correction to the display images through the gamma adjustment machine and performing the demura compensation to the display images through the demura adjustment machine 7, thereby obtaining up-to-date adjustment parameters.

Figure 4:
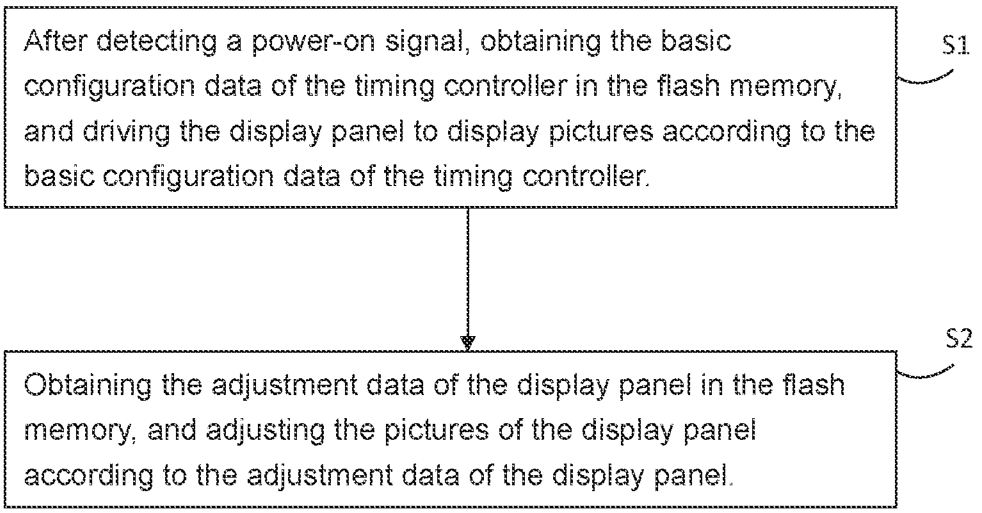
FIG. 4 is a flowchart of a driving method of the display panel according to embodiments of the present application.

Based on a same invention idea, FIG. 4 is a flowchart of a driving method of a display panel according to embodiments of the present application. As shown in FIG. 4, embodiments of the present application further provide a driving method of a display panel, and the driving method of the display panel includes:

S1, after detecting a power-on signal, obtaining the basic configuration data of the timing controller 5 in the flash memory 4, and driving the display panel to display pictures according to the basic configuration data of the timing controller 5;

S2, obtaining the adjustment data of the display panel in the flash memory 4, and adjusting the display images of the display panel according to the adjustment data of the display panel.

The driving method of the display panel according to embodiments of the present application needs only one flash memory 4 to store basic configuration data of the timing controller 5 and adjustment data of the display panel, and a number of flash memory 4 is decreased in comparison with two flash memories 4 required by conventional technology. Capacity of flash memory 4 is reasonably used, preventing a waste of capacity of flash memory 4 while saving production cost.

In some embodiments, obtaining the adjustment data of the display panel in the flash memory 4 specifically includes updating the adjustment data of the display panel through adjusting the display images of the display panel to obtain up-to-date adjustment data of the display panel and store in the flash memory 4. It should be explained that each time the adjustment data of the display panel stored in the flash memory 4 is updated, the timing controller 5 has to be refreshed, and when the display panel is reactivated, the timing controller 5 perform step S1 and step S2 again to drive the display panel to display pictures and adjust the display images of the display panel.

In some embodiments, the adjustment data of the display panel includes gamma adjustment parameters and demura compensation parameters. Adjusting the display images of the display panel according to the adjustment data of the display panel specifically includes performing gamma correction on the display panel according to the gamma adjustment parameters of the display panel in the flash memory 4 read by the timing controller 5, and performing demura compensation to the display panel according to the demura compensation parameters of the display panel in the flash memory 4 read by the timing controller 5.

In some embodiments, the flash memory 4 includes a first storage address and a second storage address. Obtaining the basic configuration data of the timing controller 5 in the flash memory 4 specifically includes reading the basic configuration data of the timing controller 5 through reading the first storage address. Obtaining the adjustment data of the display panel in the flash memory 4 specifically includes reading the adjustment data of the display panel through reading the second storage address.

The driving system and driving method of the display panel according to embodiments of the present application need only one flash memory 4 to store basic configuration data of the timing controller 5 and adjustment data of the display panel, and a number of flash memory 4 is decreased in comparison with two flash memories 4 required in conventional technology. Capacity of flash memory 4 is reasonably used, preventing a waste of capacity of flash memory 4 while saving production cost. Furthermore, the timing controller 5 is disposed in the second circuit board 3, and the flash memory 4 is disposed in the first circuit board 2. In this way, different adjustment data set according to different display panels can be stored in the flash memory 4 of the first circuit board 2, and through directly replacing the first circuit board 2, different adjustment data can be chosen, increasing flexibility of the driving system. Wherein, the adjustment data of the display panel stored in the flash memory 4 is obtained by the timing controller 5 through adjusting the display images of the display panel, i.e., the adjustment parameters of the display panel stored in the flash memory 4 is not fixed, and they are up-to-date adjustment data constantly corrected and improved during the course of adjusting the display images of the display panel.

It can be understood that a person of ordinary skill in the art can make equivalent alterations or changes according to technical approach and invention idea of the present application, and all these changes or alterations is encompassed by protection scope of claims of the present application.

What is claimed is:

1. A driving system of a display panel, comprising:

a first circuit board and a second circuit board sequentially connected to the display panel, wherein a flash memory is disposed in the first circuit board, a timing controller is disposed in the second circuit board, and the timing controller is connected to the flash memory; wherein the flash memory is configured to store basic configuration data of the timing controller and adjustment data of the display panel; and the timing controller is configured to drive the display panel to display pictures according to the basic configuration data of the timing controller in the flash memory, and adjust display images of the display panel according to the adjustment data of the display panel in the flash memory;

wherein the adjustment data of the display panel comprises gamma adjustment parameters and demura compensation parameters, and the driving system comprises a gamma adjustment machine and a demura adjustment machine separately connected to the timing controller, wherein the gamma adjustment machine is configured to perform gamma correction to the display panel according to the gamma adjustment parameters of the display panel in the flash memory read by the timing controller; and the demura adjustment machine is configured to perform demura compensation to the display panel according to the demura compensation parameters of the display panel in the flash memory read by the timing controller.

2. The driving system of the display panel as claimed in claim 1, wherein adjustment parameters of the display panel are obtained by the timing controller through adjusting the display images of the display panel.

3. The driving system of the display panel as claimed in claim 1, wherein the timing controller is connected to the flash memory through a serial interface.

4. The driving system of the display panel as claimed in claim 1, wherein the flash memory comprises a first storage address and a second storage address, the first storage address is configured to store the basic configuration data of the timing controller, and the second storage address is configured to store the adjustment data of the display panel.

5. The driving system of the display panel as claimed in claim 4, wherein a reading priority of the first storage address is higher than a reading priority of the second storage address.

6. The driving system of the display panel as claimed in claim 1, wherein the gamma adjustment machine and the demura adjustment machine are separately connected to the timing controller through a serial interface.

7. A driving method of a display panel applied to the driving system of the display panel as claimed in claim 1, wherein the driving method comprises:

after detecting a power-on signal, obtaining the basic configuration data of the timing controller in the flash memory, and driving the display panel to display the pictures according to the basic configuration data of the timing controller; and obtaining the adjustment data of the display panel in the flash memory, and adjusting the display images of the display panel according to the adjustment data of the display panel.

8. The driving method of the display panel as claimed in claim 7, wherein obtaining the adjustment data of the display panel in the flash memory specifically comprises:

updating the adjustment data of the display panel through adjusting the display images of the display panel to obtain up-to-date adjustment data of the display panel and store in the flash memory.

9. The driving method of the display panel as claimed in claim 7, wherein the adjustment data of the display panel comprises gamma adjustment parameters and demura compensation parameters;

wherein adjusting the display images of the display panel according to the adjustment data of the display panel specifically comprises:

performing gamma correction to the display panel according to the gamma adjustment parameters of the display panel in the flash memory read by the timing controller; and performing demura compensation to the display panel according to the demura compensation parameters of the display panel in the flash memory read by the timing controller.

10. The driving method of the display panel as claimed in claim 7, wherein the flash memory comprises a first storage address and a second storage address, the first storage address is configured to store the basic configuration data of the timing controller, and the second storage address is configured to store the adjustment data of the display panel.

11. The driving method of the display panel as claimed in claim 10, wherein a reading priority of the first storage address is higher than a reading priority of the second storage address.

12. The driving method of the display panel as claimed in claim 10, wherein the obtaining the basic configuration data of the timing controller in the flash memory specifically comprises:

reading the basic configuration data of the timing controller through reading the first storage address.

13. The driving method of the display panel as claimed in claim 10, wherein the obtaining the adjustment data of the display panel in the flash memory specifically comprises:

reading the adjustment data of the display panel through reading the second storage address.

14. A driving system of a display panel comprising:

a first circuit board and a second circuit board sequentially connected to the display panel, wherein a flash memory is disposed in the first circuit board, a timing controller is disposed in the second circuit board, and the timing controller is connected to the flash memory; wherein the flash memory is configured to store basic configuration data of the timing controller and adjustment data of the display panel;

the timing controller is configured to drive the display panel to display pictures according to the basic configuration data of the timing controller in the flash memory, and adjust display images of the display panel according to the adjustment data of the display panel in the flash memory; and wherein adjustment parameters of the display panel are obtained by the timing controller through adjusting the display images of the display panel;

wherein the adjustment data of the display panel comprises gamma adjustment parameters and demura compensation parameters, and the driving system comprises a gamma adjustment machine and a demura adjustment machine separately connected to the timing controller, wherein the gamma adjustment machine is configured to perform gamma correction to the display panel according to the gamma adjustment parameters of the display panel in the flash memory read by the timing controller; and the demura adjustment machine is configured to perform demura compensation to the display panel according to the demura compensation parameters of the display panel in the flash memory read by the timing controller.

15. The driving system of the display panel as claimed in claim 14, wherein the timing controller is connected to the flash memory through a serial interface.

16. The driving system of the display panel as claimed in claim 14, wherein the flash memory comprises a first storage address and a second storage address, the first storage address is configured to store the basic configuration data of the timing controller, and the second storage address is configured to store the adjustment data of the display panel.

17. The driving system of the display panel as claimed in claim 14, wherein a reading priority of the first storage address is higher than a reading priority of the second storage address.

18. The driving system of the display panel as claimed in claim 14, wherein the gamma adjustment machine and the demura adjustment machine are separately connected to the timing controller through a serial interface.

* * * * *